United States Patent
Denker et al.

(10) Patent No.: US 6,361,054 B1
(45) Date of Patent: Mar. 26, 2002

(54) SEALING DEVICE

(75) Inventors: Ernst Denker, Westerkappeln; Alois Giesker, Georgsmarienhütte; Herbert Krause, Mettingen, all of (DE)

(73) Assignee: Fritsche, Mollmann GmbH & Co. KG, Lotte (DE)

( * ) Notice: Subject to any disclaimer, the term of this patent is extended or adjusted under 35 U.S.C. 154(b) by 0 days.

(21) Appl. No.: 09/543,978

(22) Filed: Apr. 6, 2000

(30) Foreign Application Priority Data

Apr. 15, 1999 (DE) .......................................... 199 16 789

(51) Int. Cl.⁷ ................................................. F16J 15/46
(52) U.S. Cl. ....................... 277/630; 277/645; 277/646; 277/637; 277/647; 277/641; 277/652
(58) Field of Search ................................ 277/630, 645, 277/646, 647, 641, 652, 637

(56) References Cited

U.S. PATENT DOCUMENTS

| | | | | |
|---|---|---|---|---|
| 4,580,791 A | * | 4/1986 | DiRusso | 277/317 |
| 4,971,148 A | * | 11/1990 | Roche et al. | 166/88.1 |
| 5,209,498 A | * | 5/1993 | Colin | 277/646 |
| 5,214,241 A | * | 5/1993 | Benwell | 174/35 GC |
| 5,225,631 A | * | 7/1993 | Lee et al. | 277/646 |
| 5,562,295 A | * | 10/1996 | Wambeke et al. | 277/605 |
| 5,567,048 A | * | 10/1996 | Hammonds | 366/139 |
| 5,660,396 A | * | 8/1997 | Schouten | 277/500 |
| 5,730,569 A | * | 3/1998 | Bucknell | 277/646 |
| 5,901,962 A | * | 5/1999 | Wambeke | 277/312 |
| 5,961,128 A | * | 10/1999 | Klammer | 277/646 |
| 6,254,106 B1 | * | 7/2001 | Denker et al. | 277/645 |

FOREIGN PATENT DOCUMENTS

DE        197 08 579        9/1998

* cited by examiner

*Primary Examiner*—Anthony Knight
*Assistant Examiner*—Matthew E. Rodgers
(74) *Attorney, Agent, or Firm*—Kenyon & Kenyon

(57) ABSTRACT

A sealing device for sealing at least two facing surfaces of two adjacent machine elements includes an inflatable sealing tube arranged in a groove in a first surface of a first machine element. The sealing tube can be filled with a medium to which pressure can be applied, and can be inflated by the medium as well as made to rest against a second surface of a second machine element, forming a seal. The ends of the sealing tube are each arranged in an insert piece. The insert pieces are each structured as a sleeve and surround the ends of the sealing tube under elastic pre-stress, forming a seal. The sleeves are each arranged in a recess of the first machine element that extends essentially crosswise to the lengthwise direction of the groove. In the non-pressurized state, the sealing tube and the face of the sleeves that faces the second surface of the second machine element are essentially flush with the first surface of the first machine element.

17 Claims, 4 Drawing Sheets

A−A

B-B

SEALING DEVICE

FIELD OF THE INVENTION

The present invention relates generally to a sealing device for sealing a gap between two facing surfaces of two adjacent machine elements. More particularly, the invention relates to a sealing device including an inflatable sealing tube that is arranged in a groove in one of the facing surfaces.

BACKGROUND OF THE INVENTION

A sealing device similar to the present invention is known from German Patent 197 08 579 A1. In that device, at least one end of the sealing tube is surrounded by an insert piece. The insert piece can be inserted into a recess of a first machine element. Such an insert piece can be a molded part made of plastic or metal, for example. The surface of the insert piece that faces a second machine element projects beyond the surface of the first machine element in the direction of the second machine element. The insert piece also projects beyond the surface of the non-inflated sealing tube. Such an embodiment is necessary in order to obtain a continuous contact surface with the second machine element when the sealing tube is inflated.

SUMMARY OF THE INVENTION

The object of the present invention is to further develop a sealing device so that the facing surfaces are essentially level.

This object is achieved, according to the invention, by providing an inflatable sealing tube arranged in a groove in a first surface. The sealing tube is capable of being inflated so that it rests against a second surface to form a seal. Insert pieces are arranged at the ends of the sealing tube.

The insert pieces are each sleeve shaped and surround the ends of the sealing tube under elastic pre-stress to form a seal. The insert pieces are each arranged in a recess that extends essentially crosswise to the lengthwise direction of the groove. The sealing tube, in the non-pressurized state, and the face of the insert pieces that face the second surface of the second machine element, are essentially flush with the first surface of the first machine element. Preferably, the first surface of the first machine element is level, eliminating projecting insert pieces.

In another embodiment, a protective film is placed between the two machine elements. The film rests flat and level on the first machine element. The film can be formed, for example, by the surface material of an article to be produced in a foaming mold. For example, a dashboard for a motor vehicle can be used as a protective film. By precisely positioning the protective film on the first surface, the quality of the finished part is improved. Because the first surface, the insert pieces, and the sealing tube, in the non-pressurized state, are arranged to form a flush surface relative to one another, a sufficient contact surface exists relative to the surface of the protective film to assure a good seal.

The inflatable sealing tube can be made of rubber. Pressure is applied to the sealing tube only when the first surface or a protective film arranged on the first surface makes contact with the second surface. The second surface therefore forms the counter-bearing for the inflated sealing tube.

If the sealing device is used in a mold, for example, the two mold halves are moved towards each other until only a slight gap remains between the surfaces. The mold is filled with a molding material mass until it reaches the gap. The gases contained in the mold can escape through the gap up to this time. The tube is then inflated and makes contact with the second surface along the entire length of the groove, forming a seal. In the first embodiment of the sealing device, in which the sealing tube rests directly against the second surface of the second machine element to form a seal, the molding material is selected to avoid adhesion to the sealing system. As soon as the sealing tube makes contact with the second surface of the second machine element, it is possible to build up pressure in the mold.

If, on the other hand, a material such as polyurethane is used as the molding material, the sealing system must be protected against contamination with this material and from adhesion to it. This can be accomplished by providing a sealing film that rests flat and level on the first surface. The sealing film covers the sealing tube arranged within the groove, forming a seal, and makes contact with the face of the sleeve and the surface of the sealing tube that face the second surface. Protective film for the sealing tube is formed, for example, by the surface material of an article to be produced in a foaming mold. For example, a dashboard for a motor vehicle can be used to form the protective film. By using the protective film, destruction of the sealing system is prevented.

The operation of the sealing system will now be explained, using the example of a foaming mold. The protective film is placed on the first surface of the bottom part of the foaming mold and is held against the first surface by a vacuum. The protective film covers the sealing tube that is arranged within the groove. The foam mixture is filled into the bottom part of the mold and only touches the protective film, not the sealing tube. By using the protective film, it is possible to foam polyurethane (which will adhere to the sealing system) without damaging the sealing system. The top half of the mold is moved towards the bottom half of the mold until there is only a small gap between the two surfaces. The foam mixture located in the mold cavity expands, causing the mold cavity to become filled. During this filling process, the gas located in the mold cavity is forced out of the mold cavity through the slight gap between the two surfaces. When the foam mixture penetrates into the gap area, pressure is applied to the sealing tube (under time control) and the gap is gradually closed by inflating the sealing tube, which at first rests against the protective film. When further pressure is applied, the protective film forms a seal against the second surface of the top mold part. By sealing the gap, the mold cavity is closed, and the intended compacting of the foam mixture is achieved.

The inflated sealing tube touches the second machine element along its entire length, either directly, or with the protective film interposed, forming a seal.

The sealing tube can surround a filler piece under elastic pre-stress, forming a seal, at its face on both ends.

Furthermore, one of the filler pieces can have a conduit-like recess through which the pressurized medium can be fed into the sealing tube. The pressurized medium connection can be provided by a bore in the first machine element. Preferably the bore has a connection thread for a supply line. The pressurized medium that is fed into the sealing tube is preferably compressed air.

The pressure in the sealing tube is relieved, for example, by a valve within the supply line that is open to the atmosphere. This causes the medium to flow through the conduit-like recess in the filler piece and through the supply line in the direction of the atmosphere. Upon releasing the pressure, the sealing tube resumes the same position as in the non-pressurized state.

Outside of the region where it is clamped in place, the sealing tube can be shaped so that it can be lifted from the filler pieces and placed against the inside of the sleeves. Preferably, a complete seal of the entire gap between the two machine elements is provided even if at least one of the filler pieces is arc shaped. The insides of the sleeves each form a counter-bearing for the sealing tube, lifted up from the filler pieces. This prevents undesirable excessive elongation and possible damage to the sealing tube that might result from it.

The filler pieces can be designed so that they are flexible and not compressible. Preferably, the filler pieces are made of a polymer material. The filler pieces are used in order to maintain the original shape of the sealing tube and its cross-section for the flow of medium even if the sealing tube is laid in an arc shape, for example, within the first machine element. Kinking of the sealing tube, with a resulting reduction in the cross-section for the flow of medium, is prevented by the filler pieces.

In another embodiment, the sealing tube surrounds a core over its entire length. The outside diameter of the core is smaller than the inside diameter of the sealing tube. An annular gap between the core and the sealing tube forms a conduit for the medium. The core can be a tube shape, for example, and be flexible. Preferably, the core is made of a polymer material. This makes it possible to achieve the necessary flexibility. The core prevents disadvantageous kinking of the actual sealing tube in the transition region from the sleeve into the groove. By having a sufficient insertion length of the sealing tube into the sleeve, in the region of its two faces, it is not necessary to provide pre-stress or compression between the outside diameter of the core, the inside diameter of the sealing tube, the outside diameter of the sealing tube, and the inside diameter of the sleeve, to prevent leaks.

In the region of the ends of the sealing tube, the sleeves are cut out in accordance with the contour of the sealing tube, on the facing sides. This makes it possible to deflect the sealing tube from the recess within the first machine element into the groove.

The sleeves are sealingly connected with the recesses of the first machine element. Preferably, the sleeves are glued in place. The air introduced on the side of the sleeve facing away from the second surface is therefore forced to flow through the conduit-like recess of the one filler piece and into the sealing tube. This allows pressure within the sealing tube to be rapidly built up and maintained without changes over a long period of use, if necessary.

The groove can be narrowed on the side facing the second surface of the second machine element. This prevents the sealing tube from falling out of the groove unintentionally. The opening cross-section of the groove is dimensioned so that the sealing tube is held within the groove by a positive lock when no pressure is applied to it.

In accordance with another embodiment, a vacuum groove is arranged in the base of the groove. The length of the vacuum groove essentially corresponds to the length of the sealing tube between the filler pieces. A partial vacuum can be applied to the vacuum groove. This prevents the sealing tube from migrating out of the groove due to its movements relative to the groove. In addition, the vacuum tube draws the sealing tube against the base of the groove in its non-pressurized state so that the side of the sealing tube that faces the second surface is completely within the groove.

After the sealing tube is vented, the groove, including the vacuum groove, briefly has a partial vacuum applied to it. This assists the tube seal in returning to its starting dimensions. At the same time, the entire profile of the sealing tube is retracted back into the groove.

The first machine element can be structured as a mold bottom and the second machine element as a mold top. Preferably, the sealing device is used in molds for the production of molded parts made of plastic. Although a mold for the production of molded parts made of plastic can be made up of several valves and slides, in order to be able to unmold the finished molded part subsequent to its production, the sealing device according to the invention produces continuous sealing surfaces without any projections beyond the mold surface of the first machine element in the non-pressurized state of the sealing tube.

DETAILED DESCRIPTION

Figure 1:
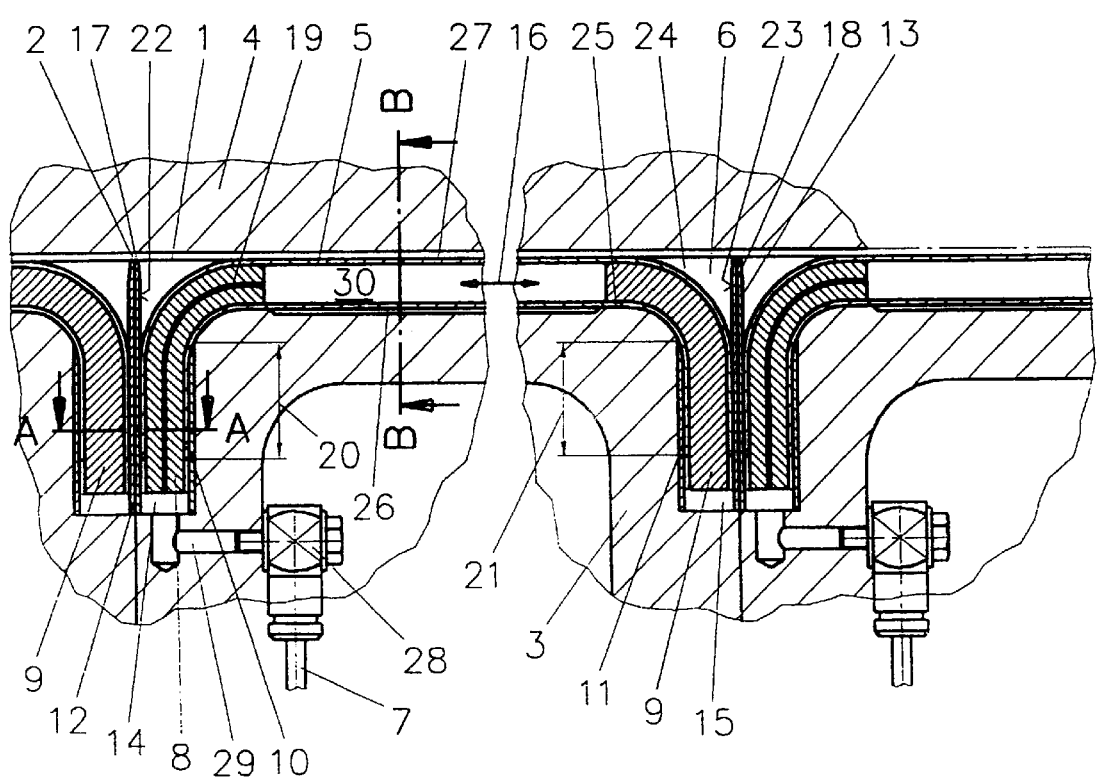
FIG. 1 shows a first exemplary embodiment of the sealing device according to the present invention, in a cross-sectional view.

FIG. 1 shows an exemplary embodiment of the sealing device according to the present invention. The mold is made up of several mold bottoms and one mold top, where the mold as a whole is used as a mold for the production of molded parts made of plastic.

The sealing device is shown in the non-pressurized state.

The first machine element 3 has a first surface 1. The first surface 1 corresponds to and is adjacent to a second surface 2 of a second machine element 4. A gap 27 is formed between the first and second surface. The gap must be sealed by a sealing tube 5 when the mold is used for its intended purpose. The sealing device includes an inflatable sealing tube 5 made of an elastomer material. A groove 6 is arranged within the first machine element 3. Sealing tube 5 is positioned in the groove 6.

In the region of its two ends 10, 11, the sealing tube 5 surrounds a filler piece 8, 9. The sealing tube is under elastic pre-stress to form a seal between the sealing tube and the filler pieces. Each of the filler pieces 8, 9 is made of a polymer material in this embodiment, and is structured to be flexible as well as essentially non-compressible. One filler piece 8 is provided with a conduit-like recess 19. The recess 19 connects a cavity 30 of the sealing tube 5 between filler pieces 8, 9 with a compressed air connection 28. The compressed air connection 28 is screwed into a connection bore 29. When pressure is applied, compressed air travels from the compressed air connection 28 through the connection bore 29, through recess 19 and into the cavity 30 of the sealing tube 5.

The two ends 10, 11 of the sealing tube 5 are each surrounded by a sleeve 12, 13. Each sleeve is glued into a corresponding recess 14, 15 of the first machine element 3 to form a pressure-tight seal between the sleeves and the recess.

The sleeves 12, 13 are arranged crosswise to the lengthwise direction 16 of the groove. The faces 17, 18 of the sleeves 12, 13 that face the second surface, as well as non-pressurized sealing tube 5, are flush with the first surface 1 of the first machine element 3.

On their sides facing away from each other, the sleeves 12, 13 extend to the first surface 1. The sides facing one another are shorter and cut out. Outside of the clamping regions 22, 23, the facing sides of the sleeves 12, 13 are cut out in such a way that the sealing tube 5 can be deflected into the groove 6 essentially at a right angle.

Figure 4:
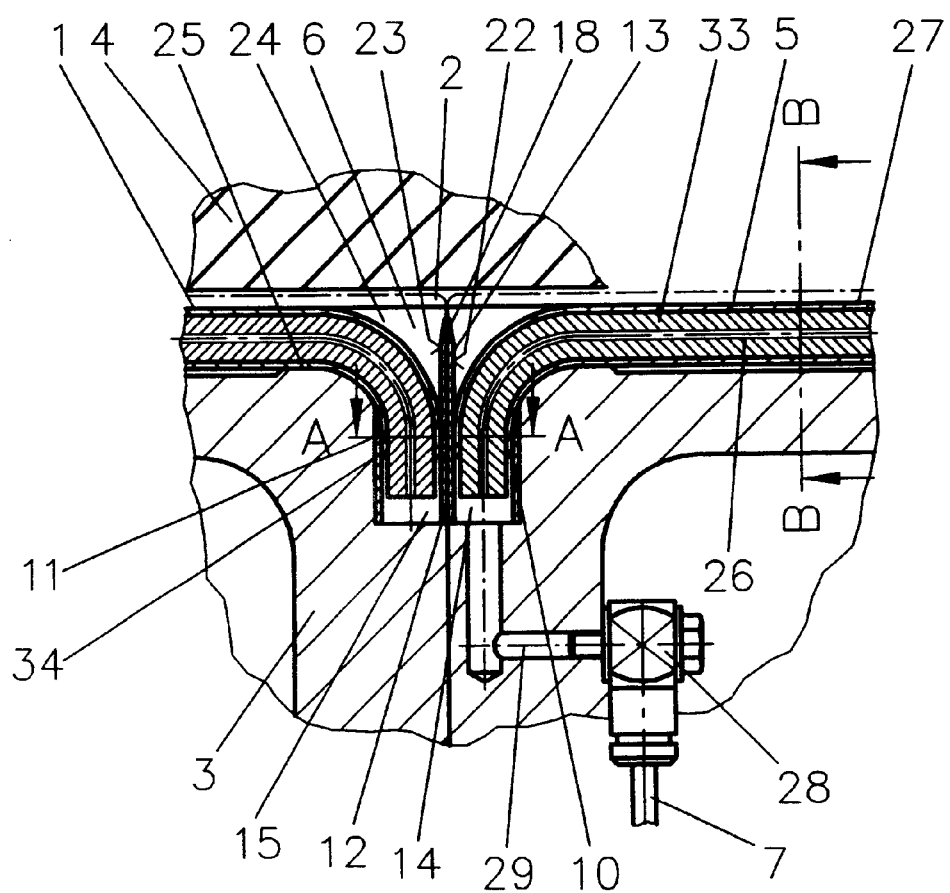
FIG. 4 shows a second exemplary embodiment of the sealing device according to the present invention, in a cross-sectional view.

In this exemplary embodiment, the groove 6 of the machine element 3 is covered by a protective film 32, forming a seal. The protective film is located a distance 27 from the second surface 2. The protective film 32 is formed, for example, by the surface material of an article to be produced in a foaming mold, for example a dashboard for a motor vehicle. The sealing tube 5, is arranged within the groove 6 with a positive lock. The tube is filled with a medium to which pressure can be applied at a predetermined point in time. By filling the sealing tube 5 with a pressurized medium 7, the sealing tube is inflated out of the groove 6 beyond the surface 1, against the second surface 2 of the second machine element 4, along its entire length, and makes contact by means of the protective film 32, forming a seal. FIG. 1 shows the sealing device in the non-pressurized state. When pressure is applied, the inflated sealing tube 5 is expanded up to the inside edges of sleeves 12, 13. This expansion takes place above the ends of sleeves 12, 13, in a gap region 27. The expanded surfaces of the sealing tube 5 that are directly adjacent to one another on the circumference rest directly against one another, as shown in FIG. 4.

In this exemplary embodiment, the mold bottom and the mold top are made of synthetic resin. The sleeves 12, 13 are glued into recesses 14, 15 in the mold. Alternatively, mold bottoms and mold tops made of metallic materials can also be used.

The sleeves can also be glued in the metallic molds. The sleeves may also be attached with additional mechanical attachment, for example a screw. The sleeves 12, 13 can be structured in such a way that the air connection for the supply of pressurizing agent is formed in this end piece.

It is important that the sealing tube extends, in each instance, to the insides 22, 23 of the two sleeves 12, 13. The extension ensures a continuous sealing surface at the second surface 2 in the inflated state. This operating state is shown in FIG. 4.

Subsequent to the production of the work piece, the excess pressure in the sealing tube 5 is gradually reduced, so that the sealing tube 5 resumes the shape shown in FIG. 1, and goes back into the groove 6. A vacuum groove 26 is provided in the exemplary embodiment shown here to assist the movement of the sealing tube 5 into the groove 6. The vacuum groove 26 can have a partial vacuum applied to it, drawing sealing tube 5 into groove base 25.

Figure 2:
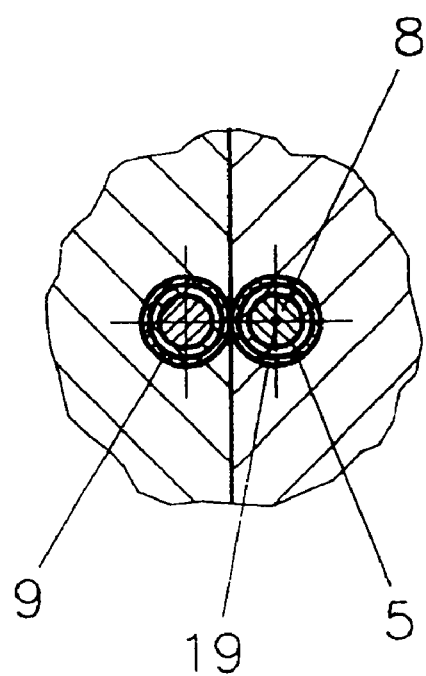
FIG. 2 shows the section A—A from FIG. 1.

FIG. 2 shows the section A—A of FIG. 1. Within the clamping region 20, 21, the ends 10, 11 of the sealing tube 5 and the filler pieces 8, 9 are surrounded by sleeves 12, 13 under elastic pre-stress, forming a seal. The first filler piece 8, in contrast to the second filler piece 9, has a conduit-like recess 19.

The two sleeves 12, 13 are glued into the recesses 14, 15 of the first machine element 3, with an airtight seal.

Figure 3:
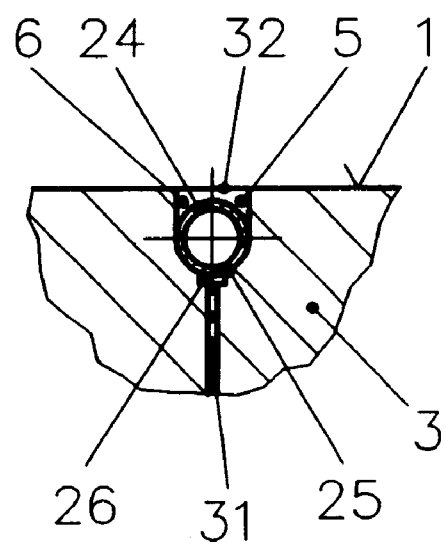
FIG. 3 shows the section B—B from FIG. 1.

FIG. 3 shows section B—B of FIG. 1. As illustrated here in the non-pressurized state, neither the sealing tube 5 nor the sleeve 12 projects beyond the first surface 1.

The sealing tube 5 is preferably arranged within the groove 6 with a positive lock. To accomplish this, the groove 6 is narrowed on the side facing the second surface 2, in the region of its opening 24.

The vacuum tube 26 is arranged on the side facing away from the opening 24, with the partial vacuum connection being indicated with the reference number 31 and shown schematically.

FIG. 4 shows a second exemplary embodiment of the present invention. In this embodiment, the sealing tube 5 surrounds a core 33 over its entire length. The outside diameter of the core 33 is smaller than the inside diameter of the sealing tube 5 to form an annular gap. The annular gap 24 forms a conduit for the medium 7. When pressure is applied to the sealing tube 5, it is lifted up off the core 33 and assumes the shape shown with the dash-dot line. The adjacent tubes touch above sleeves 12, 13, forming a seal.

What is claimed is:

1. A sealing device for sealing a gap between a first surface of a first machine element and a second surface of a second machine element, including:
   an inflatable sealing tube arranged in a groove in the first surface, the groove being open in the direction of the second surface, the sealing tube capable of being inflated by a pressurized medium so that it rests against the second surface to form a seal; and
   sleeve-like insert pieces arranged at the ends of the sealing tube under elastic pre-stress to form a seal, each of the insert pieces being arranged in a recess of the first machine element that extends essentially crosswise to the lengthwise direction of the groove,
   wherein a face of the insert pieces that faces the second surface are essentially flush with the first surface.

2. The sealing device according to claim 1, wherein the inflated sealing tube makes contact with the second machine element along its entire length, forming a seal.

3. The sealing device according to claim 2, wherein the inflated sealing tube makes contact with the protective film along its entire length.

4. The sealing device according to claim 1, wherein the sealing tube surrounds a filler piece under elastic pre-stress, forming a seal, on both ends.

5. The sealing device according to claim 4, wherein one of the filler pieces has a conduit-like recess through which the pressurized medium can be fed into the sealing tube.

6. The sealing device according to claim 4, wherein the filler pieces are both flexible and non-compressible.

7. The sealing device according to claim 4, wherein the filler pieces are made of a polymer material.

8. The sealing device according to claim 4, wherein a vacuum groove is arranged in the base of the groove, the length of which corresponds to the length of the sealing tube between the filler pieces so that a partial vacuum can be applied to the vacuum groove.

9. The sealing device according to claim 1, wherein outside of the region where the sleeves are clamped in place, the sealing tube can be lifted from the filler pieces and placed against the inside of the sleeves.

10. The sealing device according to claim 1, wherein the sealing tube surrounds a core over its entire length, the outside diameter of which is smaller than the inside diameter of the sealing tube to form an annular gap forming a conduit for the medium.

11. The sealing device according to claim 10, wherein the core is tube-shaped and flexible.

12. The sealing device according to claim 10, wherein the core is made of a polymer material.

13. The sealing device according to claim 1, wherein in the region of the ends of the sealing tube, the insert pieces are cut out in accordance with the contour of the sealing tube on the facing sides.

14. The sealing device according to claim 1, wherein the insert pieces are glued into the recesses of the first machine element.

15. The sealing device according to claim 1, wherein the groove is narrowed in the region of its opening on the side facing the second surface of the second machine element.

16. The sealing device according to claim 1, wherein the first machine element is a mold bottom and the second machine element is a mold top.

17. A sealing device for sealing a first surface of a first machine element and a second surface of a second machine element, including an inflatable sealing tube arranged in a groove in the first surface, the groove being open in the direction of the second surface;

a protective film that seals off the opening of the groove, the sealing tube capable of being inflated by a pressurized medium so that it rests against the second surface with the aid of the protective film to form a seal; and sleeve-like insert pieces surrounding the ends of the sealing tube under elastic pre-stress to form a seal, each of insert pieces arranged in a recess of the first machine element that extends essentially crosswise to the lengthwise direction of the groove, wherein the sealing tubes in the non-pressurized state, and the face of the insert pieces that faces the second surface of the second machine element, are essentially flush with the first surface.

\* \* \* \* \*

UNITED STATES PATENT AND TRADEMARK OFFICE
CERTIFICATE OF CORRECTION

PATENT NO. : 6,361,054 B1
DATED : March 26, 2002
INVENTOR(S) : Denker et al.

It is certified that error appears in the above-identified patent and that said Letters Patent is hereby corrected as shown below:

Column 8,
Line 10, change "tubes" to -- tube --.

Signed and Sealed this

Twenty-fifth Day of March, 2003

JAMES E. ROGAN
*Director of the United States Patent and Trademark Office*